(12) United States Patent
Streete

(10) Patent No.: US 9,588,412 B1
(45) Date of Patent: Mar. 7, 2017

(54) X-RAY FILM IMAGE MARKER

(71) Applicant: Jerusalmi Streete, West Sacramento, CA (US)

(72) Inventor: Jerusalmi Streete, West Sacramento, CA (US)

(*) Notice: Subject to any disclaimer, the term of this patent is extended or adjusted under 35 U.S.C. 154(b) by 224 days.

(21) Appl. No.: 14/617,995

(22) Filed: Feb. 10, 2015

(51) Int. Cl.
*H05G 1/28* (2006.01)
*G03B 42/04* (2006.01)

(52) U.S. Cl.
CPC .................. *G03B 42/047* (2013.01)

(58) Field of Classification Search
CPC .... G03B 42/047; G03B 42/025; G03B 42/04; G03C 3/00
USPC ................. 378/162, 165, 204, 205
See application file for complete search history.

(56) References Cited

U.S. PATENT DOCUMENTS

| | | | |
|---|---|---|---|
| 4,127,774 A | 11/1978 | Gillen | |
| 4,182,559 A * | 1/1980 | Driscoll | G03B 17/24 396/318 |
| 4,426,723 A | 1/1984 | Rouse | |
| 4,698,836 A | 10/1987 | Minasian | |
| 5,592,527 A | 1/1997 | Ray | |
| 5,640,438 A | 6/1997 | Talluto | |
| 6,160,870 A | 12/2000 | Jacobson | |
| 7,123,690 B1 | 10/2006 | Brown | |
| 7,127,826 B2 | 10/2006 | Russell | |
| D542,852 S | 5/2007 | Russell | |

FOREIGN PATENT DOCUMENTS

WO    WO2011066012 A1    6/2011

* cited by examiner

*Primary Examiner* — Courtney Thomas
(74) *Attorney, Agent, or Firm* — Kyle A. Fletcher, Esq.

(57) ABSTRACT

The x-ray film image marker is a device that is adapted for use with an x-ray portable cassette in order to provide the image marker capability that is used in conjunction with taking an x-ray, but also enabling a technician the ability to locate a misplaced x-ray film image marker. The x-ray film image marker includes at least one light member that illuminates or flashes for a pre-determined amount of time upon depression of an on/off button. The at least one light member aids in location of the x-ray film image marker in a poorly lit environment. The at least one speaker may be used to play an audio file in order to aid in location of the x-ray film image marker in a poorly lit environment.

20 Claims, 5 Drawing Sheets

X-RAY FILM IMAGE MARKER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of radiology and x-ray machinery, more specifically, a marker that is adapted for use with an x-ray portable cassette

SUMMARY OF THE INVENTION

The x-ray film image marker is a device that is adapted for use with an x-ray portable cassette in order to provide the image marker capability that is used in conjunction with taking an x-ray, but also enabling a technician the ability to locate a misplaced x-ray film image marker. The x-ray film image marker includes at least one light member that illuminates or flashes for a pre-determined amount of time upon depression of an on/off button. The at least one light member aids in location of the x-ray film image marker in a poorly lit environment. The x-ray film image marker may also include at least one speaker that may light member. The at least one speaker may be used to play an audio file in order to aid in location of the x-ray film image marker in a poorly lit environment. The x-ray film image marker is further defined with a housing that includes a front surface that is adorned with a body and/or side indicator. The front surface may also include a radiologist's initials thereon. The housing may also include a slot extending from a distal end. The slot is adapted to hang the housing via a hook from an x-ray portable cassette. The housing is further defined with a rear surface that includes an adhering member that is adapted to optionally secure the housing against the x-ray portable cassette.

These together with additional objects, features and advantages of the x-ray film image marker will be readily apparent to those of ordinary skill in the art upon reading the following detailed description of presently preferred, but nonetheless illustrative, embodiments of the x-ray film image marker when taken in conjunction with the accompanying drawings.

In this respect, before explaining the current embodiments of the x-ray film image marker in detail, it is to be understood that the x-ray film image marker is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the x-ray film image marker.

It is therefore important that the claims be regarded as including such equivalent construction insofar as they do not depart from the spirit and scope of the x-ray film image marker. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
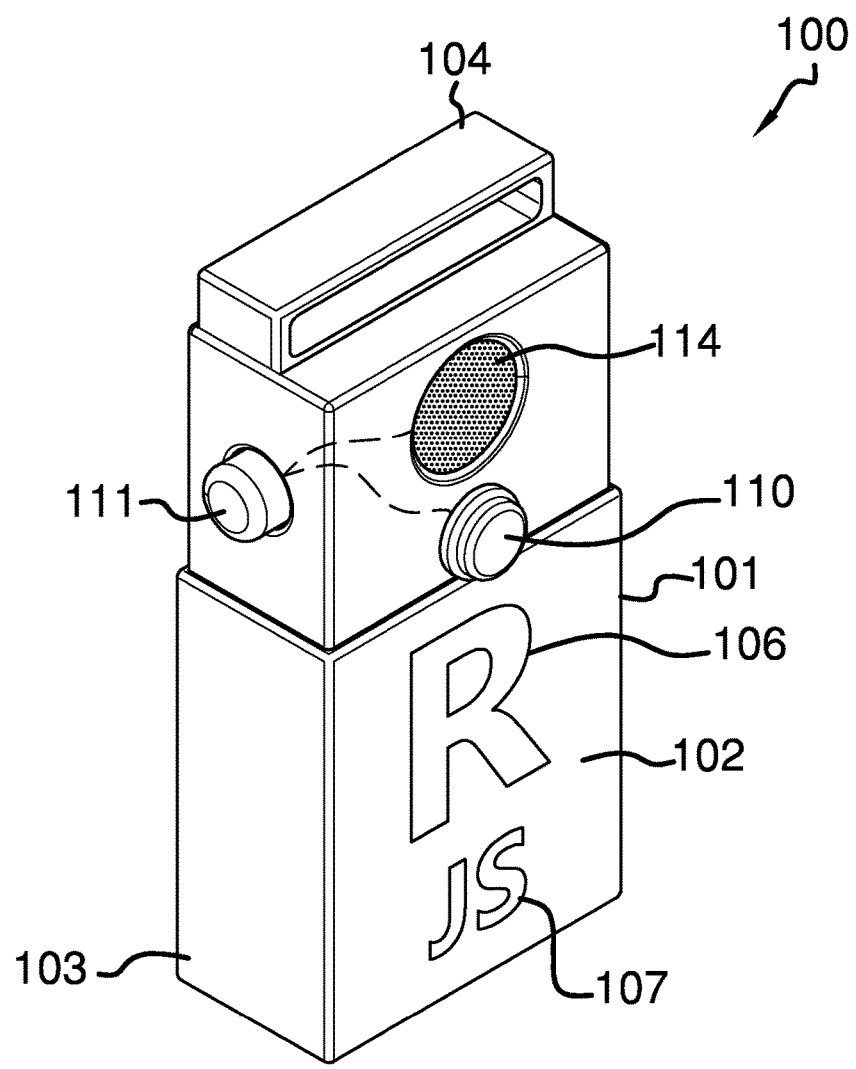
FIG. 1 illustrates a perspective view of an embodiment of the disclosure.
Figure 2:
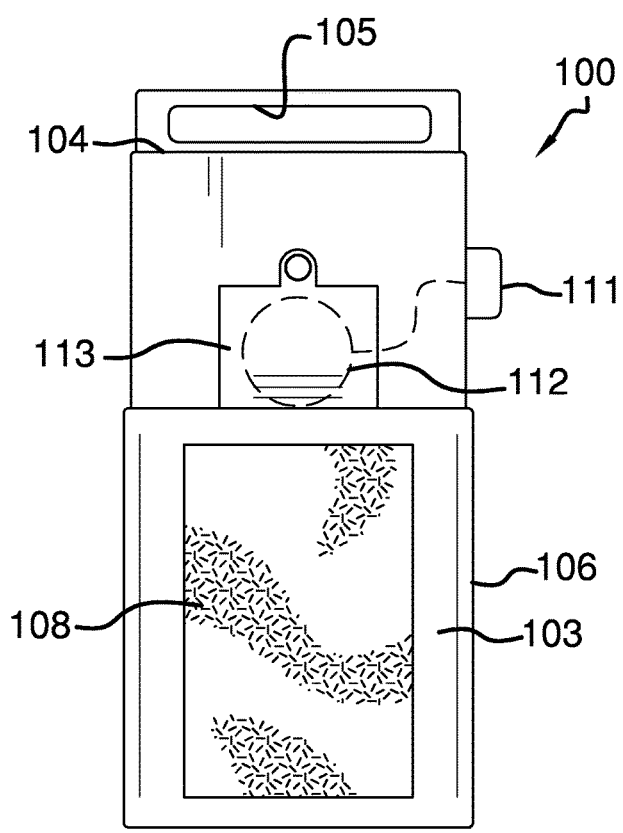
FIG. 2 illustrates a rear view of an embodiment of the disclosure.
Figure 3:
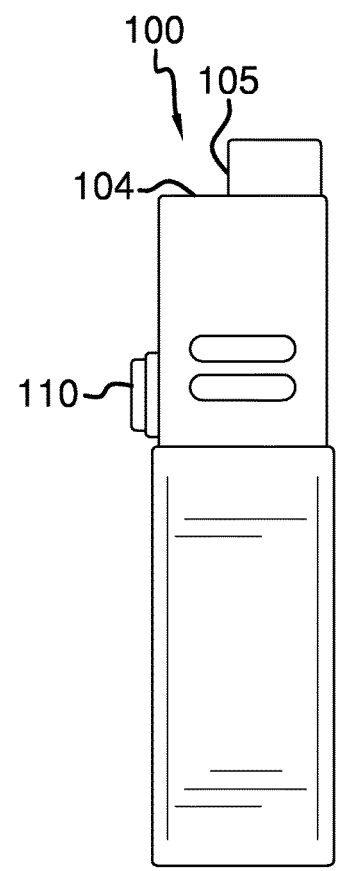
FIG. 3 illustrates a side view of an embodiment of the disclosure.
Figure 4:
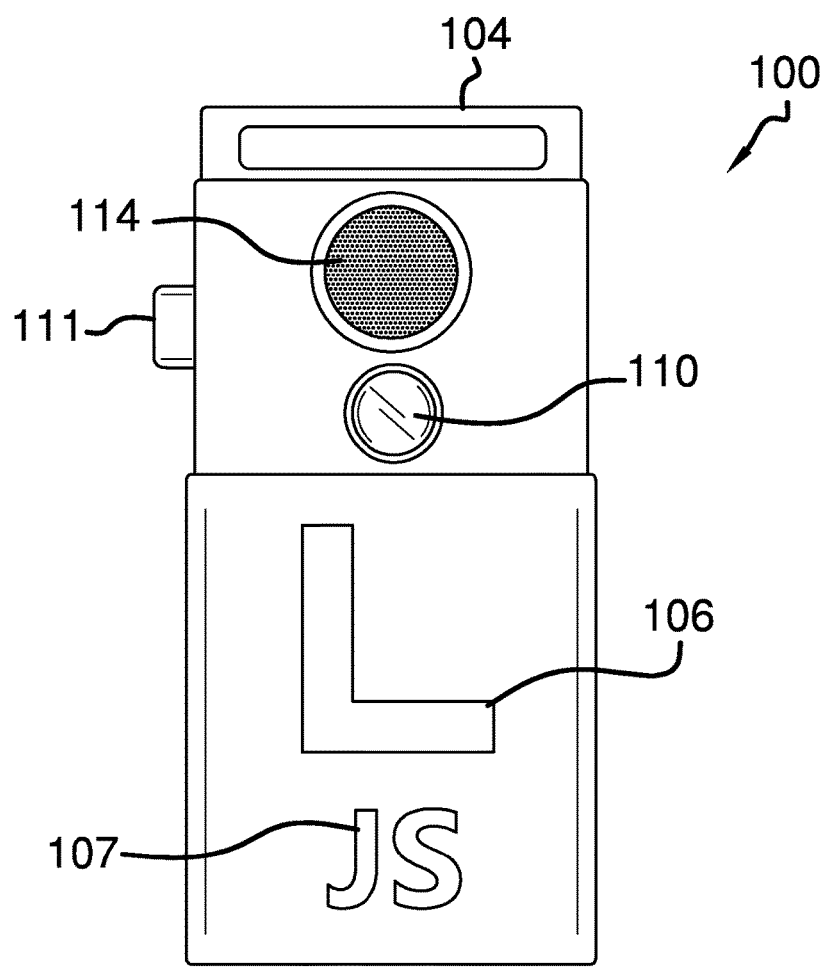
FIG. 4 illustrates a front view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. An x-ray film image marker 100 (hereinafter invention) is further defined with a housing 101 that is further defined with a front surface 102 and a rear surface 103. The housing 101 is further defined as being of hollowed construction. The housing 101 is further defined with a first distal end 104 that includes a slot member 105 protruding therefrom.

The front surface 102 and the rear surface 103 are generally planar. The front surface 102 includes a body and/or side indicator 106. The front surface 102 may also include a technician identifier 107 that may be further defined as initials of a technician. The rear surface 103 of the housing 101 is further defined as including an adhering member 108 thereon. The adhering member 108 is adapted to secure the invention 100 against an x-ray portable cassette 200. Moreover, the adhering member 108 may include a layer of adhesive to secure the housing 101 to the x-ray portable cassette 200.

Figure 5:
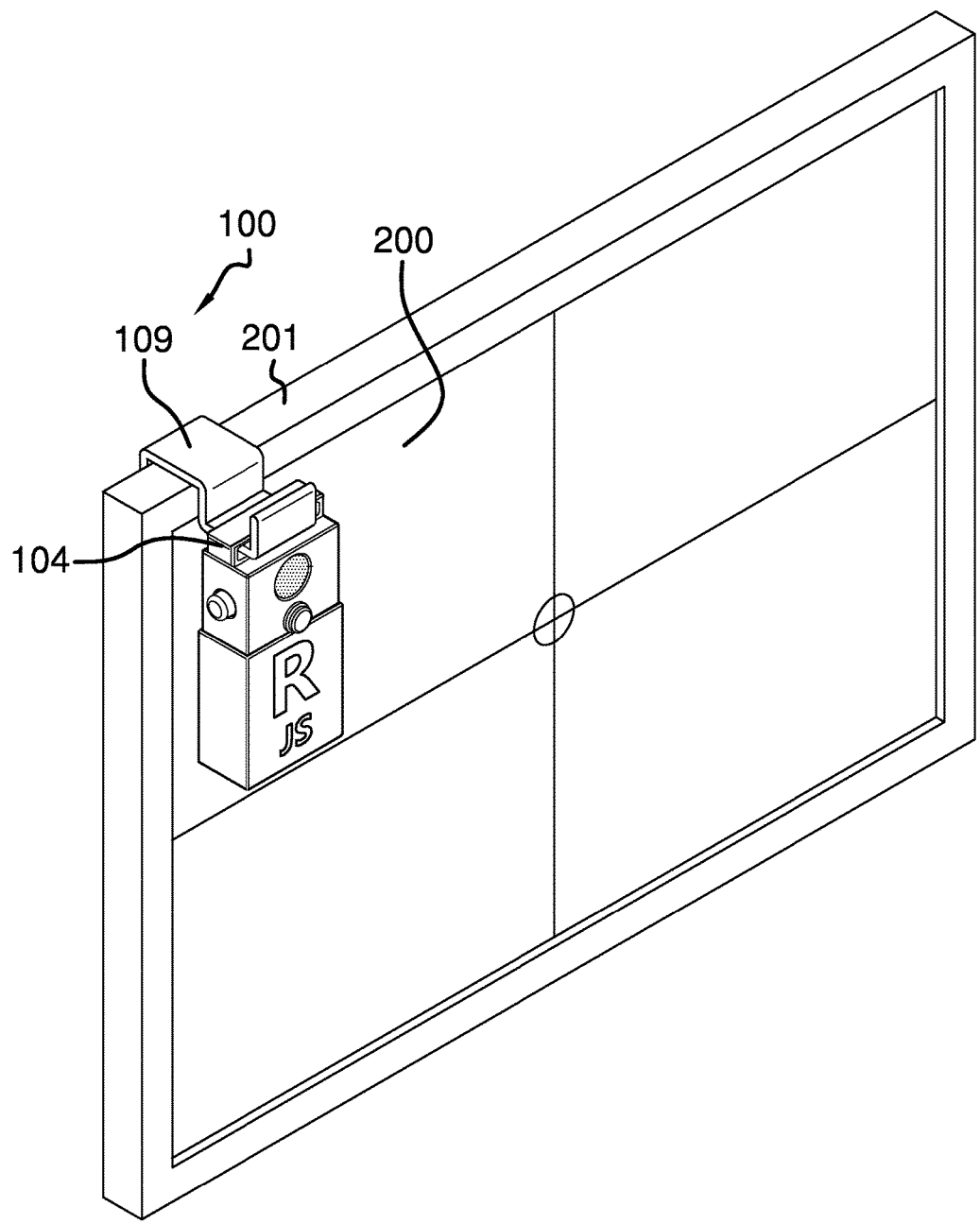
FIG. 5 illustrates a view of an embodiment of the disclosure in use.
Figure 6:
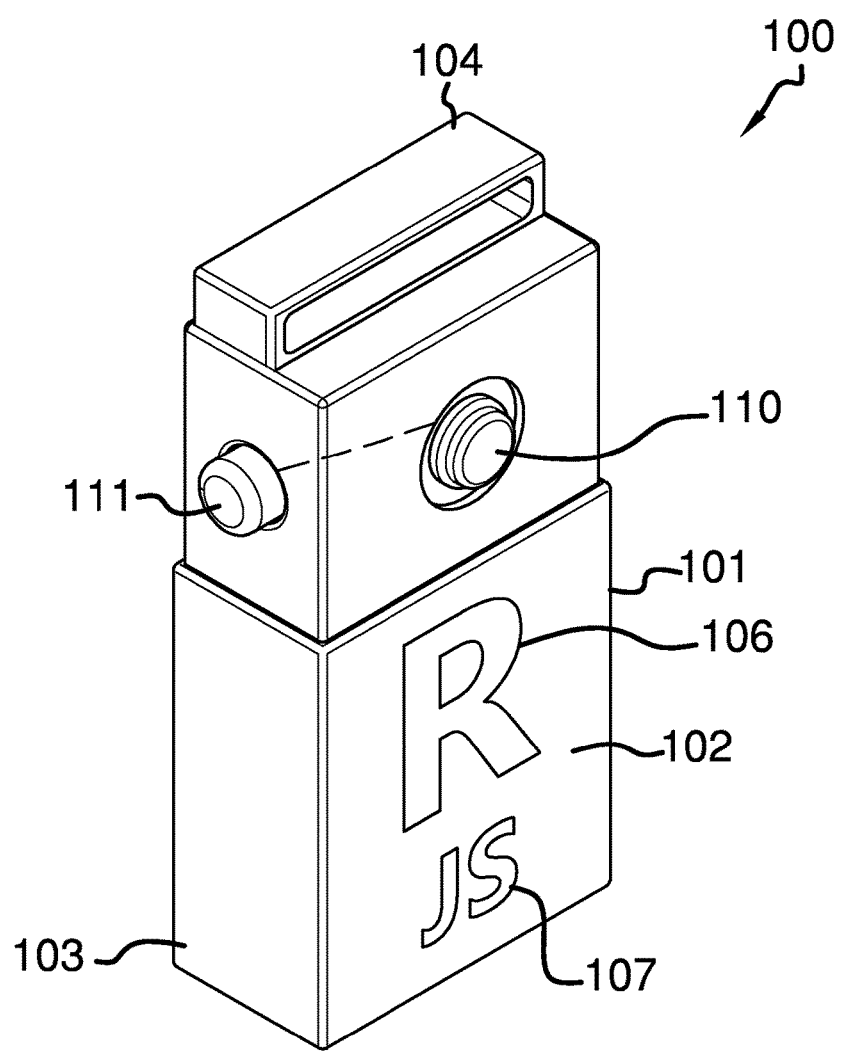
FIG. 6 illustrates another perspective view of an embodiment of the disclosure.

The slot member 105 is provided on the first distal end 104 of the housing 101 to optionally secure the housing 101 onto the x-ray portable cassette 200. Referring to FIG. 5, the slot member 105 enables a hook armature 109 to adaptively hook onto a perimeter edge 201 of the x-ray portable cassette 200.

The body and/or side indicator 106 is used to identify a side or limb or part of a patient. The invention 100 is used as an x-ray marker, and is well known in the art. The technician identifier 107 may be further defined as initials that are of the technician associated with the invention 100.

The housing 101 includes at least one light member 110 that illuminates or flashes for a pre-determined amount of time upon depression of an on/off button 111. The at least one light member 110 aids in location of the housing 100 in a poorly lit environment. The at least one light member 110 is located on the front surface 102. The at least one light member 110 may comprise the use of a light emitting diode, incandescent bulb, or fluorescent bulb. The at least one light member 110 may blink or flash for a predetermined amount of time when the on/off button 111 is depressed. The at least one light member 110 is highly visible when flashing in a poorly lit environment.

The on/off button 111 is in wired communication with a powering member 112. The powering member 112 may comprise the use of at least one battery that is located inside of a battery compartment 113 provided on the rear surface 103 of the housing 101. The powering member 112 provides electrical power to the on/off button 111, which in turn provides electrical power to the at least one light member 110 and/or speaker 114. The speaker 114 may be used in conjunction with or independent of the at least one light member 110. The speaker 114 broadcasts an audio file for a predetermined amount of time once the on/off button 111 is depressed.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An x-ray film image marker comprising:
   a housing adapted to be secured to an x-ray portable cassette;
   wherein the housing includes a body and/or side indicator thereon, and which is adapted to correlate to a patient undergoing an x-ray;
   wherein the housing includes at least one light member that flashes for a predetermined amount of time in order to aid in location of the housing in a poorly lit environment.

2. The x-ray film image marker as described in claim 1 wherein the housing is further defined with a front surface and a rear surface; wherein the housing is further defined as being of hollowed construction; wherein the housing is further defined with a first distal end that includes a slot member protruding therefrom.

3. The x-ray film image marker as described in claim 2 wherein the front surface and the rear surface are generally planar; wherein the front surface includes the body and/or side indicator thereon.

4. The x-ray film image marker as described in claim 3 wherein the front surface includes a technician identifier.

5. The x-ray film image marker as described in claim 4 wherein the rear surface of the housing is further defined as including an adhering member thereon; wherein the adhering member is adapted to secure the housing against said x-ray portable cassette; wherein the adhering member is further defined as a layer of adhesive to secure the housing to the x-ray portable cassette.

6. The x-ray film image marker as described in claim 5 wherein the slot member is provided on the first distal end of the housing to optionally secure the housing onto the x-ray portable cassette.

7. The x-ray film image marker as described in claim 6 wherein the slot member enables a hook armature to adaptively hook onto a perimeter edge of the x-ray portable cassette.

8. The x-ray film image marker as described in claim 6 wherein the housing includes the at least one light member that illuminates or flashes for a pre-determined amount of time upon depression of an on/off button.

9. The x-ray film image marker as described in claim 8 wherein the at least one light member aids in location of the housing in a poorly lit environment.

10. The x-ray film image marker as described in claim 9 wherein the at least one light member is located on the front surface; wherein the at least one light member blinks or flashes for a predetermined amount of time when the on/off button is depressed.

11. The x-ray film image marker as described in claim 10 wherein the on/off button is in wired communication with a powering member; wherein the powering member comprises the use of at least one battery that is located inside of a battery compartment provided on the rear surface of the housing.

12. The x-ray film image marker as described in claim 11 wherein the powering member provides electrical power to the on/off button, which in turn provides electrical power to the at least one light member and/or a speaker.

13. The x-ray film image marker as described in claim 12 wherein the speaker is used in conjunction with or independent of the at least one light member; wherein the speaker broadcasts an audio file for a predetermined amount of time once the on/off button is depressed.

14. An x-ray film image marker comprising:
   a housing adapted to be secured to an x-ray portable cassette;
   wherein the housing includes a body and/or side indicator thereon, and which is adapted to correlate to a patient undergoing an x-ray;
   wherein the housing includes at least one light member that flashes for a predetermined amount of time in order to aid in location of the housing in a poorly lit environment;
   wherein the housing is further defined with a front surface and a rear surface; wherein the housing is further defined as being of hollowed construction; wherein the housing is further defined with a first distal end that includes a slot member protruding therefrom.

15. The x-ray film image marker as described in claim 14 wherein the front surface and the rear surface are generally planar; wherein the front surface includes the body and/or side indicator thereon; wherein the front surface includes a technician identifier.

16. The x-ray film image marker as described in claim 15 wherein the rear surface of the housing is further defined as including an adhering member thereon; wherein the adhering member is adapted to secure the housing against said x-ray portable cassette; wherein the adhering member is further defined as a layer of adhesive to secure the housing to the x-ray portable cassette.

17. The x-ray film image marker as described in claim 16 wherein the slot member is provided on the first distal end of the housing to optionally secure the housing onto the x-ray portable cassette; wherein the slot member enables a hook armature to adaptively hook onto a perimeter edge of the x-ray portable cassette.

18. The x-ray film image marker as described in claim 17 wherein the housing includes the at least one light member that illuminates or flashes for a pre-determined amount of time upon depression of an on/off button; wherein the at least one light member aids in location of the housing in a poorly lit environment.

19. The x-ray film image marker as described in claim 18 wherein the at least one light member is located on the front surface; wherein the at least one light member blinks or flashes for a predetermined amount of time when the on/off button is depressed; wherein the on/off button is in wired communication with a powering member; wherein the powering member comprises the use of at least one battery that is located inside of a battery compartment provided on the rear surface of the housing.

20. The x-ray film image marker as described in claim 19 wherein the powering member provides electrical power to the on/off button, which in turn provides electrical power to the at least one light member and/or a speaker; wherein the speaker is used in conjunction with or independent of the at least one light member; wherein the speaker broadcasts an audio file for a predetermined amount of time once the on/off button is depressed.

* * * * *